United States Patent [19]

Tsien et al.

[11] 4,117,065

[45] Sep. 26, 1978

[54] METHOD OF FORMING CONDUCTIVE CARBON-PLASTIC MATERIAL

[75] Inventors: Hsue C. Tsien, Livingston; Agustin F. Venero, Berkeley Heights, both of N.J.

[73] Assignee: Exxon Research & Engineering Co., Linden, N.J.

[21] Appl. No.: 792,901

[22] Filed: May 2, 1977

[51] Int. Cl.$^2$ ............................................. C04B 35/00
[52] U.S. Cl. .................................... 264/105; 264/118; 264/121; 264/162
[58] Field of Search ............... 264/104, 121, 112, 105, 264/162, 118

[56] References Cited

U.S. PATENT DOCUMENTS

| | | | |
|---|---|---|---|
| 2,721,154 | 10/1955 | Hopf et al. | 427/122 |
| 2,788,297 | 4/1957 | Louis | 427/108 |
| 2,817,604 | 12/1957 | Louis | 427/108 |
| 3,081,485 | 3/1963 | Steigerwald | 264/26 |

Primary Examiner—Robert F. White
Assistant Examiner—James R. Hall
Attorney, Agent, or Firm—Kenneth P. Glynn

[57] ABSTRACT

A method of forming a conductive carbon-plastic material having increased surface area and enhanced surface conductivity characteristics is described. A conductive carbon-plastic material is molded from a mixture containing particulate conductive carbon and plastic material. The surface of the resulting conductive carbon-plastic material is simultaneously abraded and embedded with carbon particles by the projection of a dry mixture of compacted carbon and metal particles against the surface by means of propulsion. This dry mixture of compacted carbon and metal particles is obtained by ball milling a mixture of specified amounts and sizes of carbon and metal particles. Zinc metal particles are preferred.

11 Claims, No Drawings

METHOD OF FORMING CONDUCTIVE CARBON-PLASTIC MATERIAL

BACKGROUND OF THE INVENTION

The present invention is directed to a method of forming a conductive carbon-plastic material and more particularly is directed to the formation of a conductive carbon-plastic material having increased surface area and enhanced surface conductivity characteristics.

During the past few years, an increasing demand for various types of conductive plastic materials has arisen as their potentialities have been more fully appreciated and the methods of producing them have been improved. These conductive plastic materials are particularly useful as electric conductors in various electronics applications. Additionally, these materials have recently been found to be useful in the preparation of certain types of electrodes for electrochemical cell, fuel cell and related applications. Moreover, these materials have a general use in any electrical application wherein conductive plastic and insulative plastic interfaces may be needed.

Numerous techniques have been developed for forming conductive carbon-plastic materials and for applying particulate conductive material to plastic surfaces. Exemplary of these prior art teachings are U.S. Pat. Nos. 3,081,485 (K. H. Steigerwald); 2,817,604 (A. S. Louis); 2,788,297 (A. S. Louis); and, 2,721,154 (P. P. Hopf et al). While these patents describe techniques for propelling conductive materials against plastic surfaces or otherwise embedding conductive particles in plastic surfaces, they rely on certain specified vehicles such as glass impactor particles, slurry mixtures, electromagnetic forces, or steel balls. It is believed that the method of the present invention utilizing a unique vehicle to achieve simultaneous embedding and abrading, as described herein, has not been set forth or recognized heretofore as a useful technique for producing conductive carbon-plastic materials with enhanced surface characteristics.

DETAILED DESCRIPTION OF THE PRESENT INVENTION

The present invention is directed to a method of forming a conductive carbon-plastic material having enhanced surface conductivity characteristics. In the method of the present invention, a conductive carbon-plastic material is molded from a mixture containing particulate conductive carbon and plastic material, the carbon being of a specified particle size. The molded material is then simultaneously abraded on its surface and embedded with carbon particles. The simultaneous abrading and embedding is achieved by projecting a dry mixture of compacted carbon and metal particles against the surface of the conductive carbon-plastic material by means of propulsion.

The starting materials employed in the method of the present invention are those which make up a mixture containing particulate conductive carbon and plastic material. The particulate conductive carbon used in this mixture is one having a particle size in general in the range of about 10 millimicrons to about 100 microns. Desirably, the particulate conductive carbon is within the size range of about 10 to about 100 millimicrons and preferred is particulate conductive carbon within the narrower size range of about 20 to about 40 millimicrons. The particulate conductive carbon may be any of the electrically conductive-type carbon particles such as graphite and carbon black. Two types of the carbon blacks which are particularly suitable because of the ease with which they may be compounded with various plastic materials are those which are known by the trademarks Ketjenblack EC (sold by Noury Chemical Corp. of Burt, New York, and Cabot "Vulcan XC-72" (sold by Cabot Corp. of Boston, Mass.). Other commercially available particulate conductive carbon may be used as will be recognized by the artisan.

The plastic material used in the mixture may be a thermoplastic or a thermoset material or may be a high polymer. It may be loaded with filler materials and may contain other physical property enhancing additives. Thus, fillers such as minerals, asbestos, glass fibers, extenders, plasticizers, flame retardants, etc., may be included. Examples of suitable plastic materials are electrical grades of phenolformaldehyde resins, polyacrylic resins such as polymethylmethacrylate, polyvinyl resins such as polystyrene and polyvinyl chloride and polyolefins such as polyethylene, polypropylene and mixtures thereof. There may also be used mixtures of thermoplastic and thermoset resins such as various styrene copolymers and the products obtained by the use of such mixtures as phenol-formaldehyde condensation products with polyvinyl chloride. Thus, the term "plastic material" as used herein shall be taken to mean the foregoing plastics alone when used alone to make the conductive carbon-plastic materials of the present invention, and to mean these plastics with any of the foregoing additives in those instances in which the additives are to be included in making the conductive carbon-plastic materials of the present invention.

The particulate conductive carbon and the plastic materials used for molding the conductive carbon-plastic material are employed in the method of the present invention so that the starting material mixture contains about 10% to about 50% particulate conductive carbon and about 90% to about 50% plastic material, based on the total weight of the particulate conductive carbon and plastic material. Desirably, at least about 15% to about 25% particulate conductive carbon and about 85% to about 75% plastic material, and preferably about 20% to about 25% particulate conductive carbon and about 80% to about 75% plastic material, is used, based on the mentioned total weight.

The starting mixture containing the plastic and the particulate conductive carbon may be formed into any one of a variety of shapes. For example, it may be molded into sheets, into wound or twisted or fibrous extruded materials, elliptical or polygonal shapes, arc shaped structures, extruded forms, films or plates, and blocks. The starting mixture may be pre-blended so as to effectuate the formation of a homogeneous conductive carbon-plastic material in the preferred embodiments of the present invention. Alternatively, the conductive carbon in the plastic material may form a heterogeneous material in which the particulate matter may be evenly or even randomly dispersed throughout the plastic. In any event, a critical aspect in the formation of the conductive carbon-plastic material is the amount of conductive carbon used relative to the amount of plastic material within the ranges stated above so as to assure electrical conductivity of the end product.

After the starting mixture containing the particulate conductive carbon and the plastic material have been molded into a desired structure in accordance with the present invention, one or more of the surfaces of the resulting material is simultaneously embedded with carbon particles and abraded to increase the surface area and to create enhanced surface conductivity characteristics. This simultaneous embedding and abrading is achieved by projecting a dry mixture of compacted carbon and metal particles against the surface of the conductive carbon-plastic material at a predetermined pressure. The dry mixture of compacted carbon and metal particles is obtained by ball milling a mixture of specified amounts and sizes of carbon and metal particles. In general, mixtures containing about 5% to about 30% carbon and about 95% to about 70% metal particles are used, based on the total weight of the carbon and metal. Preferred are mixtures containing about 10% to about 20% carbon and about 90% to about 80% metal particles based on the total weight of the carbon and metal. The carbon employed is, in general, smaller in particle size than the metal particles and as a result of the ball milling, the two are compacted, the metal particles being somewhat coated by the carbon. The carbon particle size may be about 5 millimicrons to about 50 microns and is desirably about 10 to about 20 millimicrons. Preferred is the carbon having a particle size of about 15 to about 20 millimicrons. The metal particles may be any metal particle which will compact with the carbon and allow the carbon to be embedded during the process, e.g., zinc, aluminum, lead, copper, iron, nickel and the like. These metal particles are generally about 10 to about 200 microns in size, and are desirably about 20 to about 150 microns. Preferred are metal particles having a size of about 50 to about 100 microns. The carbon and metal particles are ball milled by any known ball milling technique, either dry or wet. However, dry ball milling techniques are preferred because wet ball milling will require pre-drying of the compacted carbon and metal particles before they are projected against the surface of the conductive carbon-plastic material to be treated.

The compacted carbon and metal particles are projected against the desired surfaces, as mentioned, by propulsion. The invention involves the use of various types of gas propulsion and in particular the use of inert gases such as air, nitrogen or carbon dioxide. For example, a gas propelled stream of compacted carbon and metal particles may be projected against the surface of a conductive carbonplastic material through a closely confined precisely defined nozzle, e.g., through an air gun. In general, a pressure of at least about 50 psig is used. Desirably, a pressure of about 50 psig to about 150 psig may be used although higher pressures are feasible but not as cost efficient. Preferred pressures range from about 90 to about 130 psig.

By the method described above, a conductive carbonplastic material having enhanced surface conductivity characteristics is achieved. Further, unlike some of the products obtained by the prior art techniques, the conductivity is enhanced without appreciable build-up in the thickness of the carbon-plastic material, yet with a fuzzy or increased surface area.

Although the foregoing method is in itself complete for achieving the objectives of the present invention, it should be noted that various additional steps might be included as desired, depending upon the nature of the final product sought. For example, a pre-embedding step might be used to abrade the surface to be treated, e.g., by projection of metal or ceramic or refractory particles against the surface. Also, after the carbon has been embedded in the treated surface, after-treatment may be useful, e.g., light pressure rolling or the like. Further, during the actual embedding of the carbon, supplemental steps may be employed. For example, it might be useful to create a slight amount of softening in the conductive carbon-plastic material to be abraded and embedded with particles. This may be achieved, for example, by preheating the material to a slightly softened state. Alternatively, this may be achieved by using pre-heated compacted carbon and metal particles to propel against the surface of the conductive carbon-plastic material. Of course, any other heating technique may be used to obtain a desirable degree of softening of the carbon-plastic material to aid in the desired embedding of conductive particles into the surface of the conductive carbon plastic material, if desired.

As mentioned in the background of the invention above, conductive carbon-plastic materials have various uses in the electrical and electronic industries. One particular use which was mentioned above involves the construction of the electrochemical devices. By the method of the present invention, it should be noted that a conductive carbon-plastic material is obtained which has increased surface area and enhanced surface conductivity characteristics. Other advantages are apparent. For example, it should be clear that by the method of the present invention, a lesser amount of total conductive material may be used to obtain conductive carbon-plastic material having a very high surface conductivity.

Other advantages of the present invention may become apparent from the following specific examples. These examples are presented merely to be illustrative of the present invention and the invention should not be construed to be limited thereto:

EXAMPLE 1

A conductive carbon-plastic material is formed by blending a mixture of 52.5% "Propathane" polypropylenepolyethylene copolymer made by Imperial Chemical Industries, Ltd. of Herts, England and 47.5% Cabot Corporation "Vulcan XC-72" carbon black having an average particle size of about 30 millimicrons. The material is molded by extrusion into thin sheets of about 0.012 inches thick.

Two sheets, designated Sheet A and Sheet B, are abraded with No. 3 aluminum oxide sandblasting to slightly enhance current density characteristics but surface conductivity is not appreciably improved. With the use of an "Airbrasive" Unit made by S.S. White Industrial Products of Piscataway, N.J., a mixture of 15% by weight of Cabot Corporation "Black Pearls 700" carbon having a particle size of about 18 millimicrons and 85% by weight of zinc powder having a particle size of 50 to 100 microns, which has been compacted by ball milling, is projected against the surface of Sheet B with air at a pressure of about 120 psig. The treatment is continued until about 0.5 g of carbon per square decimeter is embedded in the surface. For this example, projection at a particular location on the sheet for about 10 seconds provides this amount of embedded carbon.

Upon examination of treated Sheet B, a "fuzzy" carbon surface layer is observed. Measurement of cell voltage versus current density of a conventional zinc-bromine cell where treated Sheet B was used as a cathode revealed a lower cell polarization than obtained by the untreated carbon plastic electrode, Sheet A. Table I below illustrates this point.

TABLE I

| Current Density (A/dm$^2$) | Sheet A Carbon-Plastic Untreated Present Invention | Sheet B Carbon-Plastic of Invention |
|---|---|---|
| Charge | Volts | Volts |
| 1 | 1.904 | 1.828 |
| 2 | 2.009 | 1.902 |
| 3 | 2.095 | 1.971 |
| 4 | 2.158 | 2.041 |
| 5 | 2.210 | 2.108 |
| 6 | 2.254 | 2.174 |
| Discharge | | |
| 1 | 1.449 | 1.663 |
| 2 | 1.233 | 1.586 |
| 3 | 0.929 | 1.500 |
| 4 | <0.5 | 1.421 |
| 5 | <0.5 | 1.350 |
| 6 | <0.5 | 1.310 |

EXAMPLE 2

To make quantitative measurements of increased surface area and enhanced surface conductivity characteristics of the present invention, a sheet prepared in accordance with the present invention as exemplified by all the steps of Example 1 (designated as Sheet C), was tested along with a sheet of carbon plastic to which a high surface area film, 0.008 inch thick, had been hot-pressed to obtain good electrical contact (designated as Sheet D). This particular film which is hot pressed is prepared by mixing an appropriate high surface area carbon black with a Telfon-water suspension, followed by drying and cold rolling into film. The technique, which is known in the art, is an expensive and time-consuming multistep method of obtaining increased properties. Sheets C and D were tested as cathodes in a conventional zincbromine cell. The results of the experiments, in terms of the cell voltage versus current density, is given in Table II. The data indicates that the performance of the treated cathode using the present invention (Sheet C) is as good as that obtained by the less efficient and more complicated method of film hot-pressing (Sheet D).

TABLE II

CHARGE AND DISCHARGE CELL VOLTAGE FOR A Zn/Br$_2$ SINGLE CELL BATTERY AT VARIOUS CURRENT DENSITIES

| Current Density (A/dm$^2$) | Sheet C Carbon-Plastic of Present Invention | Sheet D Carbon-Plastic With Hot-Pressed High Surface Film |
|---|---|---|
| Charge | Volts | Volts |
| 1 | 1.828 | 1.807 |
| 2 | 1.902 | 1.864 |
| 3 | 1.971 | 1.917 |
| 4 | 2.041 | 1.968 |
| 5 | 2.108 | 2.018 |
| 6 | 2.174 | 2.066 |
| Discharge | | |
| 1 | 1.663 | 1.673 |
| 2 | 1.586 | 1.610 |
| 3 | 1.500 | 1.549 |
| 4 | 1.421 | 1.492 |
| 5 | 1.350 | 1.442 |
| 6 | 1.310 | 1.403 |

EXAMPLE 3

Examples 1 and 2, Sheets B and C respectively, are repeated except that the conductive carbon plastic material is formed by blending a mixture of 80% polyethylene-polypropylene copolymer made by Hercules Plastics Division, Wilmington, Delaware, under the trade designation "Pro-Fax 8523 PM" with about 20% particulate conductive carbon sold under the trade designation "Ketjenblack EC" discussed above, having a particle size of about 30 millimicrons. The material is molded by extrusion into thin sheets of about 0.012 in. thick and treated as described to obtain sheets having increased surface area and enhanced surface conductivity characteristics.

What is claimed is:

1. A method of forming a conductive carbon-plastic material having enhanced surface conductivity characteristics, comprising:
   (a) molding a conductive carbon-plastic material from a mixture containing about 10% to about 50% particulate conductive carbon and about 90% to about 50% plastic material, based on the total weight of the particulate conductive carbon and plastic material, said carbon having a particle size within the range of about 10 millimicrons to about 100 microns;
   (b) forming a dry mixture of compacted carbon and metal particles by ball milling a mixture containing about 5% to about 30% of conductive carbon having a particle size of about 5 millimicrons to about 50 millimicrons and about 95% to about 70% of metal particles having a particle size of about 10 microns to about 200 microns based on the total weight of the carbon and metal particles; and
   (c) simultaneously abrading the surface of said conductive carbon-plastic material and embedding carbon particles therein by projecting against said surface said dry mixture of compacted carbon and metal particles at a pressure of at least about 50 psig.

2. The method of claim 1 wherein, in step (a), said mixture contains about 15% to about 25% particulate conductive carbon and about 85% to about 75% plastic material.

3. The method of claim 2 wherein the particulate conductive carbon of step (a) has a particle size of about 10 millimicrons to about 100 millimicrons.

4. The method of claim 2 wherein, in step (c), said dry mixture is projected against said surface at a pressure of about 50 to about 150 psig.

5. The method of claim 4, wherein, in step (b), the mixture contains about 10% to about 20% of conductive carbon having a particle size of about 10 millimicrons to about 20 millimicrons and about 90% to about 80% of metal particles having a particle size of about 20 microns to about 150 microns.

6. The method of claim 5 wherein said metal particles are zinc particles.

7. The method of claim 5 wherein, in step (a), said mixture contains about 20% to about 25% particulate conductive carbon and about 80% to about 75% plastic material.

8. The method of claim 7 wherein the particulate conductive carbon of step (a) has a particle size of about 20 millimicrons to about 40 millimicrons.

9. The method of claim 7 wherein, in step (c), said dry mixture is projected against said surface at a pressure of about 90 to about 130 psig.

10. The method of claim 9 wherein, in step (b), the mixture contains conductive carbon having a particle size of about 15 millimicrons to about 20 millimicrons and metal particles having a particle size of about 50 microns to about 100 microns.

11. The method of claim 10 wherein said metal particles are zinc particles.

* * * * *